(12) United States Patent
Dörrer et al.

(10) Patent No.: US 6,963,737 B2
(45) Date of Patent: Nov. 8, 2005

(54) CIRCUIT CONFIGURATION FOR METERING PULSE RECOGNITION

(75) Inventors: Lukas Dörrer, Villach (AT); Bernd Krah, München (DE); Christian Kranz, Ratingen Lintorf (DE)

(73) Assignee: Infineon Technologies AG, Munich (DE)

( * ) Notice: Subject to any disclaimer, the term of this patent is extended or adjusted under 35 U.S.C. 154(b) by 81 days.

(21) Appl. No.: 10/141,843

(22) Filed: May 9, 2002

(65) Prior Publication Data

US 2002/0177430 A1 Nov. 28, 2002

Related U.S. Application Data

(63) Continuation of application No. PCT/DE00/03927, filed on Nov. 7, 2000.

(30) Foreign Application Priority Data

Nov. 9, 1999 (DE) .......................................... 199 53 889

(51) Int. Cl.[7] .............................................. H04M 11/00
(52) U.S. Cl. ....................................... 455/405; 379/124
(58) Field of Search ................................ 455/405, 423, 455/67.11, 406, 407, 408; 379/124, 111, 114.01

(56) References Cited

U.S. PATENT DOCUMENTS

| | | | | |
|---|---|---|---|---|
| 3,852,533 A | | 12/1974 | Henrickson et al. | |
| 3,931,471 A | * | 1/1976 | Geuens et al. | 379/124 |
| 4,066,843 A | * | 1/1978 | Waks et al. | 379/111 |
| 4,192,972 A | * | 3/1980 | Bertoglio et al. | 379/144.01 |
| 5,172,407 A | * | 12/1992 | Alenius | 379/124 |
| 5,452,345 A | * | 9/1995 | Zhou et al. | 379/124 |
| 5,620,920 A | | 4/1997 | Wilmsmeyer | |
| 5,862,469 A | | 1/1999 | Antonello et al. | |
| 6,052,575 A | * | 4/2000 | Lahdemaki et al. | 455/407 |

FOREIGN PATENT DOCUMENTS

| | | |
|---|---|---|
| DE | 36 35 477 A1 | 4/1988 |
| DE | 37 38 846 C1 | 2/1989 |
| EP | 0 200 847 A2 | 11/1986 |
| GB | 2 313 017 A | 11/1997 |
| WO | WO 97/24852 | 7/1997 |

* cited by examiner

*Primary Examiner*—Erika A. Gary
(74) *Attorney, Agent, or Firm*—Laurence A. Greenberg; Werner H. Stemer; Gregory L. Mayback

(57) ABSTRACT

A circuit configuration for metering pulse recognition includes an A/D converter that receives a signal containing metering pulses, and a digital comparator circuit for comparing the output signal from the A/D converter with a reference value. A detector unit evaluates the output signal from the comparator circuit. This means that an analog comparator can be dispensed with, and the chip area and the development complexity can be reduced.

15 Claims, 3 Drawing Sheets

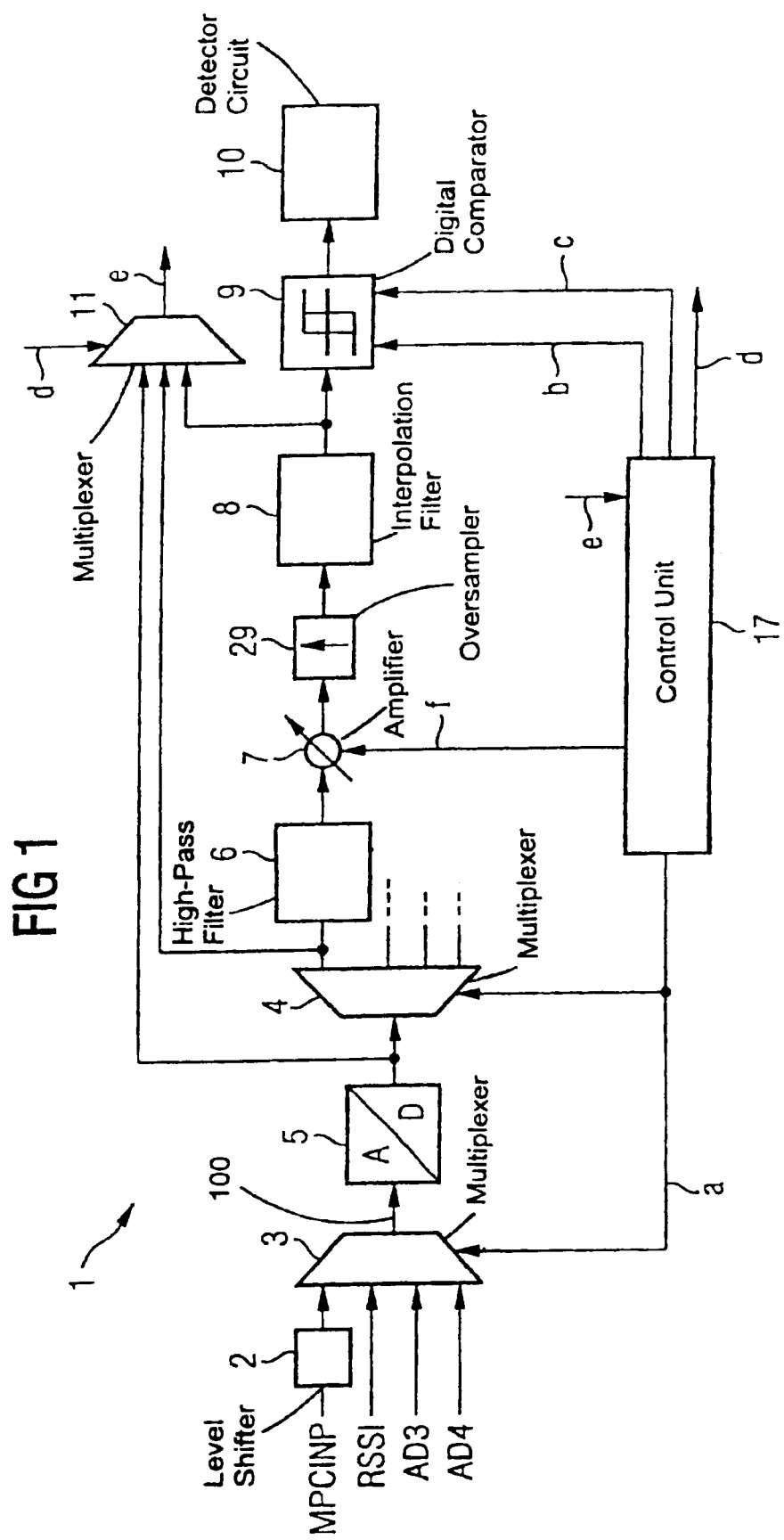

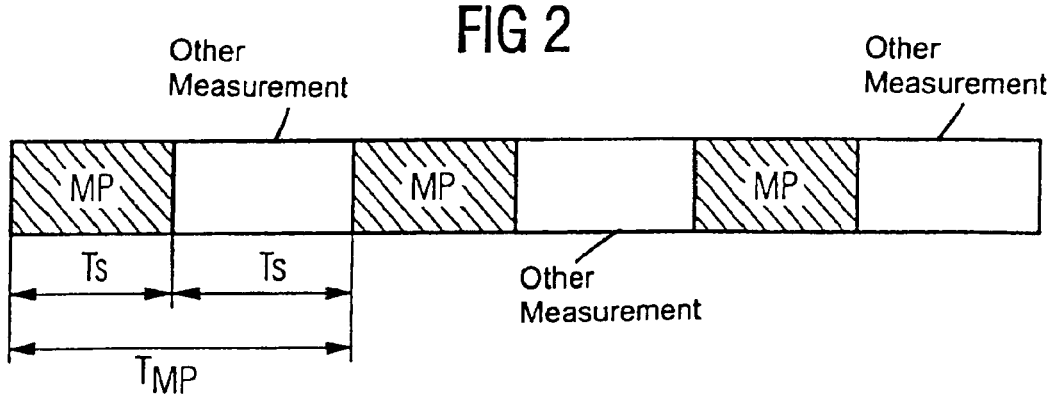
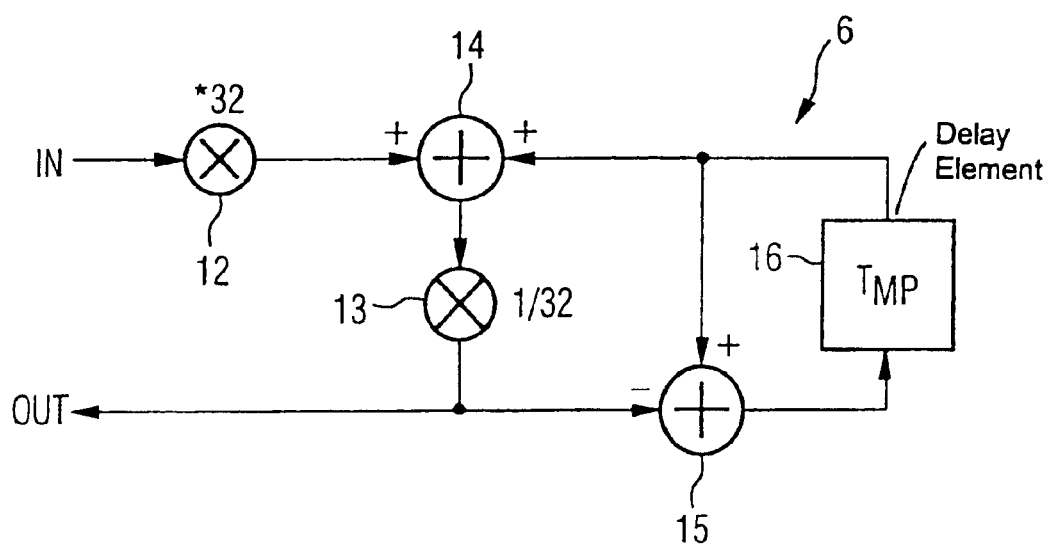

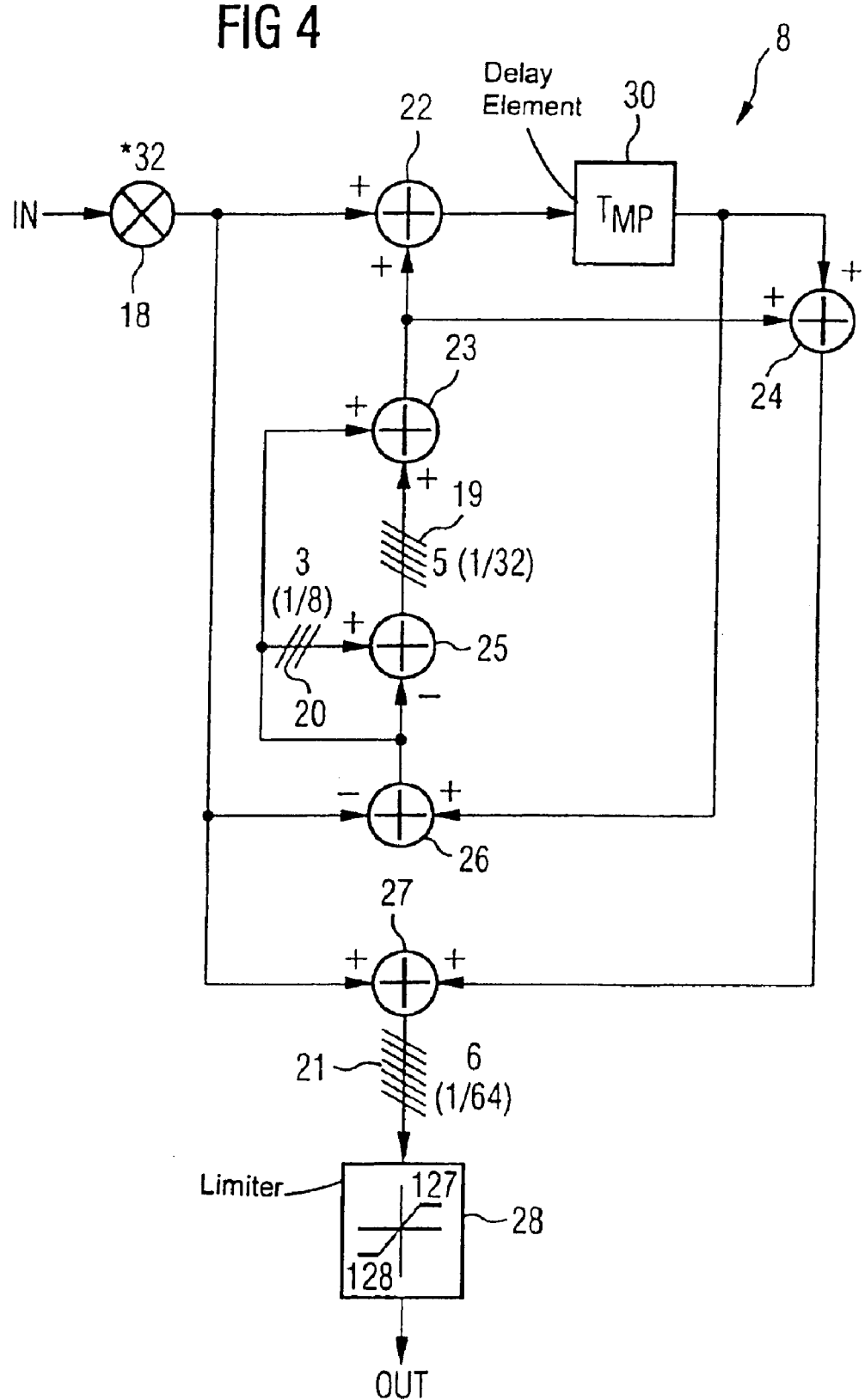

CIRCUIT CONFIGURATION FOR METERING PULSE RECOGNITION

CROSS-REFERENCE TO RELATED APPLICATION

This application is a continuation of copending International Application No. PCT/DE00/03927, filed Nov. 7, 2000, which designated the United States and was not published in English.

BACKGROUND OF THE INVENTION

Field of the Invention

The present invention relates to a circuit configuration for metering pulse recognition in telecommunications networks.

In the telephone networks in numerous countries, metering pulses are routed from the local exchanges to the subscribers. The subscriber terminals recognize and count these metering pulses, which are produced in line with a particular charging clock pulse, in order to notify the respective subscriber of the call costs incurred during a telephone call.

The metering pulses are produced in the form of short signal bursts of a prescribed frequency outside the voice frequency band. The frequencies used for the metering pulses are, by way of example, 12 kHz, 16 kHz and, less commonly, 50 Hz.

The technical demands on the circuit configurations provided for metering pulse recognition in the subscriber terminals are greatly dependent on the country. Thus, the minimum voltage level for the metering pulses on the subscriber terminal in Sweden, for example, is just 5.5 mV, whereas it is much higher in Belgium at 20 mV. In addition, stringent requirements for distinguishing between valid and invalid metering pulses need to be observed in various countries. Thus, by way of example, in Italy, metering pulses at a voltage of 50 mV are invalid, whereas metering pulses at a voltage of 65 mV are actually valid. On the other hand, the maximum permissible voltage for metering pulses is no more than 10 V. These examples make it clear that the subscriber terminals require highly sensitive special circuits for metering pulse recognition in order to meet the licensing specifications described above.

Published European Patent Application EP 0 200 847 A2 discloses a method and a device for sending and receiving telephone metering pulses on a carrier frequency. The metering pulses received are processed by a cascade circuit. This cascade circuit includes, connected in series in a first part of the circuit configuration, a changeover switch, an impedance converter, a bandpass filter, a level control amplifier and a comparator. The output signal from the comparator is applied to a phase locked loop which is used to ascertain the received carrier frequency of the metering pulses received. To this end, the phase locked loop is calibrated by a transmitted carrier frequency. This transmitted carrier frequency is produced by a radio-frequency generator. The output signal from the phase locked loop is applied to a pulse conditioning circuit that produces DC voltage pulses when the amplitudes of the DC voltage signals at the output of the phase locked loop have values within a voltage range. These DC voltage pulses produced correspond to the metering pulses. The signal processing is carried out exclusively on an analog basis.

The known apparatus is of very complex and complicated design and is therefore limited in terms of its miniaturization.

For metering pulse recognition, base stations based on the DECT mobile radio standard (Digital European Cordless Telephone) have used a circuit configuration having an analog comparator designed to have a hysteresis and an offset of less than 5 mV. The comparator is followed by a digital circuit that generates the aforementioned decision regarding the presence or absence of a (12 kHz/16 kHz) metering pulse from the output signal from the comparator.

However, this circuit configuration is problemat to the extent that the above hysteresis and offset values can be attained only with an integrated offset compensation section. In addition, the use of the analog comparator makes the chip area required for the overall circuit configuration and also the development complexity relatively high.

SUMMARY OF THE INVENTION

It is accordingly an object of the invention to provide a circuit configuration for metering pulse recognition which overcomes the above-mentioned disadvantages of the prior art apparatus this general type.

In particular, it is an object of the invention to provide a circuit configuration for metering pulse recognition which has reduced implementation complexity.

With the foregoing and other objects in view there is provided, in accordance with the invention, a circuit configuration for metering pulse recognition, that includes: an input for obtaining a signal containing metering pulses of a particular frequency and a particular amplitude; an A/D converter circuit connected to the input for obtaining the signal containing the metering pulses of the particular frequency and the particular amplitude; and a detection device for recognizing and counting the metering pulses of the particular frequency and the particular amplitude. The A/D converter circuit provides an output signal. The detection device includes a digital comparator circuit for performing a comparison of the output signal from the A/D converter circuit with a reference value and for providing an output signal dependent upon the comparison. The detection device includes a detector unit for evaluating the output signal from the digital comparator circuit.

In accordance with an added feature of the invention, there is provided, a level shifter that provides the signal containing the metering pulses of the particular frequency and the particular amplitude to the A/D converter circuit.

In accordance with an additional feature of the invention, a digital interpolation filter is connected between the A/D converter circuit and the digital comparator circuit.

In accordance with another feature of the invention, a limiter is connected in series with the digital interpolation filter.

In accordance with a further feature of the invention, an oversampler is connected upstream from the digital interpolation filter in order to increase a sampling frequency.

In accordance with a further added feature of the invention, an amplifier stage with a programmable gain factor is connected between the A/D converter circuit and the digital comparator circuit.

In accordance with a further additional feature of the invention, the oversampler is configured between an amplifier stage and the digital interpolation filter.

In accordance with another added feature of the invention, a digital high-pass filter is connected between the A/D converter circuit and the digital comparator circuit.

In accordance with another additional feature of the invention, a first multiplexer circuit having a plurality of inputs is provided. One of the plurality of the inputs of the first multiplexer circuit is for obtaining the signal containing the metering pulses, while others of the plurality of the inputs of the first multiplexer circuit are for obtaining further signals. The first multiplexer circuit has an output connected to the A/D converter circuit. The first multiplexer circuit receives a control signal. The control signal controls which one of the plurality of the inputs of the first multiplexer circuit is connected to the A/D converter circuit.

In accordance with another further feature of the invention, there is provided, a second multiplexer circuit having an input and a plurality of outputs. The input of the second multiplexer circuit receives the output signal from the A/D converter circuit. One of the plurality of the outputs of the second multiplexer circuit is connected to the digital comparator circuit. The second multiplexer circuit receives the control signal. The control signal, in addition to controlling the first multiplexer, controls which one of the plurality of the outputs of the second multiplexer circuit is provided with the output signal from the A/D converter circuit.

In accordance yet an added feature of the invention, there is provided, a control unit producing the control signal such that upon each second sampling operation, the A/D converter circuit measures the signal containing the metering pulses, subjects the signal containing the metering pulses to an A/D conversion and supplies the signal containing the metering pulses to the digital comparator circuit.

In accordance yet an additional feature of the invention, the digital comparator circuit receives the reference value as a programmable value.

In accordance yet another feature of the invention, the digital comparator circuit has a programmable hysteresis.

With the foregoing and other objects in view there is provided, in accordance with the invention, a method of metering pulse recognition in a mobile radio base station, which includes steps of: using the circuit configuration to perform the metering pulse recognition in a mobile radio base station.

The inventive circuit configuration includes an analog/ digital or A/D converter for the A/D conversion of the signal containing the metering pulses, and a digital comparator which compares the output signal from the A/D converter with a reference value. The output signal from the digital comparator is evaluated by a detector that takes the decision regarding whether or not a (valid) metering pulse is present and counts the metering pulses. The inventive circuit configuration thus dispenses with the otherwise customary analog comparator. The chip area and the development complexity can therefore be reduced.

In the present invention, the implementation complexity is very low particularly because, by way of example, controllers for mobile radio terminals and also many other subscriber terminals require and already contain an A/D converter for the A/D conversion of various other signals on the basis of the system. This A/D converter can therefore be used for metering pulse recognition instead of the otherwise separate analog comparator.

The use of a high-pass filter between the A/D converter and the digital comparator allows the DC component of the sampled input signal to be suppressed. The use of a programmable amplifier stage makes it possible to influence the sensitivity and to match it to the respective requirements. Similarly, the digital comparator can have an oversampler and an interpolation filter connected upstream of it in order to increase the sampling frequency and hence to improve the frequency precision of the circuit configuration.

The present invention is suitable, in principle, for use in all telecommunications units where metering pulse recognition is required, with the invention being particularly suitable for use in mobile radio terminals operated on the basis of the DECT mobile radio standard, for example.

Other features which are considered as characteristic for the invention are set forth in the appended claims.

Although the invention is illustrated and described herein as embodied in a circuit configuration for metering pulse recognition, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 shows a simplified block diagram of an exemplary embodiment of a circuit configuration for metering pulse recognition;

FIG. 2 is an illustration for clarifying the operation of the input multiplexers shown in FIG. 1;

FIG. 3 shows an exemplary embodiment of the high-pass filter shown in FIG. 1; and FIG. 4 shows an exemplary embodiment of the interpolation filter shown in FIG. 1.

DESCRIPTION OF THE PREFERRED EMBODIMENTS

Referring now to the figures of the drawing in detail and first, particularly, to FIG. 1 thereof, there is shown a circuit configuration 1 for metering pulse recognition, which can be used in a mobile radio, for example. The circuit configuration 1 includes an input 100 connected to an A/D converter 5 to which a signal MPCINP ("Meter Pulse Comparator Input") containing the metering pulses is supplied via a level shifter 2. Since the A/D converter 5 is also provided for A/D conversion of other analog signals RSSI, AD3 and AD4 in order to reduce the circuit complexity, the A/D converter 5 has a first multiplexer 3 connected upstream of it and a second multiplexer 4 connected downstream of it. Both multiplexers 3, 4 are driven by a control signal a) from a control unit 17. The multiplexer 3 connects a respective one of its inputs to its output and hence also to the A/D converter 5 on the basis of the current value of the control signal a), while the multiplexer 4 supplies the output signal from the A/D converter 5 to a respective one of a plurality of signal paths on the basis of the current value of the control signal a). For the sake of clarity, FIG. 1 shows only the signal path provided for processing samples of the MPCINP signal, and hence for metering pulse recognition. It goes without saying that signal paths are also provided for processing the individual samples of the RSSI, AD3 or AD4 signal and are connected to a respective output of the multiplexer 4. Each of these signal paths is of no significance to the present invention and therefore is mentioned below. It will merely be mentioned at this point that the RSSI signal can, by way of example, be a field strength measurement signal, the AD3 signal can be a battery voltage measurement signal, and the AD4 signal can be a current measurement signal, etc., for the mobile radio.

The MPCINP input of the multiplexer 3 is subjected to time-division multiplexing on the basis of the scheme shown in FIG. 2. FIG. 2 shows the sampling period $T_s$ for the multiplexer 3, so that the illustration in FIG. 3 reveals that the MPCINP or metering pulse input of the multiplexer 3 is measured upon every second measurement or sampling. The metering pulse measurement period $T_{MP}$ thus corresponds to twice the value of the sampling period $T_s$ of the multiplexer 3. It should be noted in this context that the inverse of the metering pulse measurement period $T_{MP}$ needs to be, in line with the sampling theorem, at least twice as great as the metering pulse frequency which is to be detected. The other sampling times of the multiplexer 3 are available for measuring the other input signals of the multiplexer 3. As has already been mentioned, the multiplexer 4 is switched in temporal synchronism with the multiplexer 3 in order to ensure that the sample of the currently sampled, A/D converted input signal of the multiplexer 3 is always supplied to the correct signal path for further processing.

The signal path which is associated with the sample of the metering pulse or MPCINP signal and is shown in FIG. 1 includes a high-pass filter 6 provided in order to suppress the DC component of the MPCINP signal. An amplifier stage 7 connected downstream can be used to influence, and particularly to increase, the sensitivity. The gain factor of this amplifier stage 7 can be programmed using a control signal f) from the control unit 17, with the result that it is thus possible to change over, by way of example, between the gain factor values "x1", "x2" and "x4" as options. An oversampler 29 ("Repeater") and an interpolation filter 8 are used to increase the sampling frequency and hence to improve the frequency precision.

The samples of the metering pulse signal MPCINP which are processed in this way are compared with a particular reference value or mean value by a digital comparator 9. This reference value can preferably be programmed using a control signal b) from the control unit 17 in order to be able to match the comparison threshold to the respective requirements of a specific country, since the DC component contained in the metering pulse signal can differ from country to country. The digital comparator 9 delivers a positive or negative output signal depending on whether its input signal value is greater than or less than the reference value. In the simplest case, the reference value in the digital comparator 9 corresponds to the value "zero", so that the digital comparator 9 detects the zero crossings of the output signal from the A/D converter 5. A further control signal c) from the control unit 17 can also be used to program the hysteresis of the digital comparator.

The output signal from the digital comparator 10 is evaluated by a conventional digital detector circuit 10 in order thus to be able to recognize and count the (valid) metering pulses.

For the sake of completeness, FIG. 1 shows a further multiplexer 11 driven by a further control signal d). The multiplexer 11 is supplied with signal values at different points on the signal path running from the A/D converter to the digital comparator, with the output signal e) from the multiplexer 11 being supplied to the control unit 17. The control unit 17 can thus monitor the respective current signal values at the corresponding points on this signal path on the basis of the current value of the control signal d). The multiplexer 11 is used exclusively for test purposes and is of no significance to the present invention in principle.

FIG. 3 shows an exemplary embodiment of the digital high-pass filter 6 shown in FIG. 1. The input signal IN for the high-pass filter 6 is first multiplied by the factor 32 using a multiplier 12. This is followed by a recursive filter structure including adders 14 and 15, a multiplier (multiplication factor $\frac{1}{32}$) or divider 13 and a delay element 16 having a delay time which corresponds to the metering pulse measurement period $T_{MP}$, with the individual components being connected as shown in FIG. 3. The output signal OUT from this recursive digital high-pass filter 6 is supplied to the amplifier stage 7, as shown in FIG. 1. The multiplication factors of the multipliers 12 and 13 respectively correspond to powers of two, so that the multiplications can be produced by simple bit shift operations, and no real hardware multipliers, which are of relatively complex structure, are required.

FIG. 4 shows an exemplary embodiment of the interpolation filter 8 shown in FIG. 1. The interpolation filter includes a multiplier 18, dividers 19–21, adders 24–27 and a delay element 30, with the individual components being connected as shown in FIG. 4. In the case of the interpolation filter 8 too, all the multiplication or division factors can be represented by powers of two, so that the multiplication and division operations can be produced by simple bit shift operations. The divider 19 has, by way of example, the division factor $\frac{1}{32}$, which can be produced using a bit shift of five bits to the right for the corresponding digital sample word. For each divider 19–21, FIG. 4 shows the number of bits by which the respective sample word needs to be shifted in the form of a corresponding number of marks. In addition, this bit number is shown with the corresponding division factor for each divider 19–21. The output signal OUT from the interpolation filter 8 is output via a limiter 28 which limits the respective sample to a minimum and maximum value. In the exemplary embodiment shown, the limiter 28 is in the form of an 8-bit limiter, which means that the value range limited by the limiter 28 is −128 . . . 0 . . . 127.

We claim:

1. A circuit configuration for detecting metering pulse in a subscriber terminal, comprising:
   an input for obtaining a signal containing metering pulses;
   an A/D converter circuit connected to said input for obtaining the signal containing the metering pulses, said A/D converter circuit providing an output signal;
   a level shifter providing the signal containing the metering pulses to said A/D converter circuit;
   a detection device; and
   a digital interpolation filter connected between said A/D converter circuit and said digital comparator circuit;
   said detection device including a digital comparator circuit for performing a comparison of the output signal from said A/D converter circuit with a reference value and for providing an output signal dependent upon the comparison; and
   said detection device including a detector unit for determining and counting valid metering pulses in the output signal from said digital comparator circuit.

2. A circuit configuration for detecting metering pulses in a subscriber terminal, comprising:
   an input for obtaining a signal containing metering pulses;
   an A/D converter circuit connected to said input for obtaining the signal containing the metering pulses, said A/D converter circuit providing an output signal;
   a detection device;
   said detection device including a digital comparator circuit for performing a comparison of the output signal from said A/D converter circuit with a reference value and for providing an output signal dependent upon the comparison; and said detection device including a detector unit for determining and counting valid metering pulses in the output signal from said digital comparator circuit; and a digital interpolation filter connected between said A/D converter circuit and said digital comparator circuit.

3. The circuit configuration according to claim 2, comprising:

a limiter connected in series with said digital interpolation filter.

4. The circuit configuration according to claim 3, comprising:

an oversampler connected upstream from said digital interpolation filter in order to increase a sampling frequency.

5. The circuit configuration according to claim 2, comprising:

an oversampler connected upstream from said digital interpolation filter in order to increase a sampling frequency.

6. The circuit configuration according to claim 5, comprising:

an amplifier stage;

said oversampler being configured between said amplifier stage and said digital interpolation filter.

7. A circuit configuration, comprising:

an input for obtaining a signal containing metering pulses;

an A/D converter circuit connected to said input for obtaining the signal containing the metering pulses, said A/D converter circuit providing an output signal;

a detection device;

said detection device including a digital comparator circuit for performing a comparison of the output signal from said A/D converter circuit with a reference value and for providing an output signal dependent upon the comparison; and said detection device including a detector unit for determining and counting valid metering pulses in the output signal from said digital comparator circuit; and an amplifier stage with a programmable gain factor being connected between said A/D converter circuit and said digital comparator circuit.

8. The circuit configuration according to claim 7, comprising:

a digital interpolation filter connected between said A/D converter circuit and said digital comparator circuit; and an oversampler connected upstream from said digital interpolation filter in order to increase a sampling frequency;

said oversampler being configured between said amplifier stage and said digital interpolation filter.

9. The circuit configuration according to claim 8, comprising:

a digital high-pass filter connected between said A/D converter circuit and said digital comparator circuit.

10. A circuit configuration for detecting metering pulses in a subscriber terminal, comprising:

an input for obtaining a signal containing metering pulses;

an A/D converter circuit connected to said input for obtaining the signal containing the metering pulses, said A/D converter circuit providing an output signal;

a detection device;

said detection device including a digital comparator circuit for performing a comparison of the output signal from said A/D converter circuit with a reference value and for providing an output signal dependent upon the comparison; and said detection device including a detector unit for determining and counting valid metering pulses in the output signal from said digital comparator circuit; and a first multiplexer circuit having a plurality of inputs;

one of said plurality of said inputs of said first multiplexer circuit being for obtaining the signal containing the metering pulses;

others of said plurality of said inputs of said first multiplexer circuit being for obtaining further signals;

said first multiplexer circuit having an output connected to said A/D converter circuit;

said first multiplexer circuit receiving a control signal; and the control signal controlling which one of said plurality of said inputs of said first multiplexer circuit being connected to said A/D converter circuit.

11. The circuit configuration according to claim 10, comprising:

a digital high-pass filter connected between said A/D converter circuit and said digital comparator circuit.

12. The circuit configuration according to claim 10, comprising:

a second multiplexer circuit having an input and a plurality of outputs;

said input of said second multiplexer circuit receiving said output signal from said A/D converter circuit;

one of said plurality of said outputs of said second multiplexer circuit being connected to said digital comparator circuit;

said second multiplexer circuit receiving the control signal; and the control signal, in addition to controlling said first multiplexer, controlling which one of said plurality of said outputs of said second multiplexer circuit is provided with said output signal from said A/D converter circuit.

13. The circuit configuration according to claim 12, comprising:

a control unit producing the control signal such that upon each second sampling operation, said A/D converter circuit measures the signal containing the metering pulses, subjects the signal containing the metering pulses to an A/D conversion and supplies the signal containing the metering pulses to said digital comparator circuit.

14. The circuit configuration according claim 10, wherein said digital comparator circuit receives the reference value as a programmable value.

15. The circuit configuration according to claim 10, wherein said digital comparator circuit has a programmable hysteresis.

* * * * *